US006929411B2

United States Patent
Christiansen et al.

(10) Patent No.: US 6,929,411 B2
(45) Date of Patent: Aug. 16, 2005

(54) SELECTABLE CONTROL OF RASTER IMAGE PROCESSOR

(75) Inventors: Robert D. Christiansen, Boise, ID (US); Ouri Poupko, Nes-ziona (IL); Scott C. Clouthier, Boise, ID (US); Amir Gaash, Rehovot (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 56 days.

(21) Appl. No.: 10/654,415

(22) Filed: Sep. 3, 2003

(65) Prior Publication Data

US 2005/0058481 A1 Mar. 17, 2005

(51) Int. Cl.[7] .................................................. B41J 3/42
(52) U.S. Cl. ............................ 400/70; 400/61; 400/62; 358/1.15; 358/1.18
(58) Field of Search .............................. 400/61, 62, 70, 400/76; 358/1.1, 1.9, 1.15–1.18

(56) References Cited

U.S. PATENT DOCUMENTS

| | | | |
|---|---|---|---|
| 5,964,156 A | * | 10/1999 | Smith et al. ................ 101/471 |
| 6,327,050 B1 | | 12/2001 | Motamed et al. |
| 6,332,149 B1 | | 12/2001 | Warmus et al. |
| 6,348,973 B1 | | 2/2002 | Vatland et al. |
| 6,353,483 B1 | | 3/2002 | Laverty et al. |
| 6,362,895 B1 | | 3/2002 | Laverty et al. |
| 6,433,885 B1 | | 8/2002 | Verghese et al. |
| 6,441,920 B1 | * | 8/2002 | Smith ......................... 358/1.2 |
| 6,449,053 B2 | * | 9/2002 | Bando ........................ 358/1.15 |
| 6,483,524 B1 | | 11/2002 | Petchenkine et al. |
| 6,519,053 B1 | | 2/2003 | Motamed et al. |
| 6,559,958 B2 | | 5/2003 | Motamed et al. |

OTHER PUBLICATIONS

Beyond The RIP (Part I)—Digital Front Ends Ease Document Workflow, By Don Monkerud, Digital Publishing Solutions Digital Document Solutions For Business, file://C:/Documents%20Settings\Poole\Local%20Settings\Temporary%20Internet% . . . (Sep. 3, 2003).

Beyond The RIP (Part II)—Digital Front Ends Provide Additional Functions to RIPs, By Don Monkerud, Digital Publishing Solutions Digital Document Solutions For Business, file://C:/Documents%20and%20Settings\Poole\Local%20Settings\Temporary%20Internet%...(Sep.3,2003).

* cited by examiner

Primary Examiner—Minh Chau

(57) ABSTRACT

Digital printing technologies often rely on raster image processors (RIPs or RIP engines) to convert vector image data to raster, or bit-map, data, which allows a printer to render the image as a pattern of dots or pixels. One problem that the present inventors recognized with conventional RIPs is that they have limited communications capabilities that can in some circumstances reduce their effective processing speed. Accordingly, at least some embodiments of the present invention allow controlling a RIP engine using two or more different RIP control entities.

21 Claims, 2 Drawing Sheets

SELECTABLE CONTROL OF RASTER IMAGE PROCESSOR

BACKGROUND

Almost all digital printing and image-display technologies rely on a technique known as raster image processing to produce images on a passive or active display medium, such as paper or an electronic screen. In this technique, a hardware or software module, called a raster image processor (RIP or RIP engine), converts vector image data (a geometrical form of image data that facilitates image storage and manipulation) to raster data. The raster data, also known as bit-map data or hardware-ready bits, allows a printer or display to render the image as a pattern of dots or pixels.

In recent years, it has become common, particularly in professional printshops, to use two or more RIPs to rasterize some types of print jobs. For example, some jobs are so large that two or more RIPs are used to reduce the time spent rasterizing and thereby increase production rates. Also, some jobs include two or more types of vector image data, with each type requiring its own specialized form of RIP to convert it to raster data.

In both these cases, the multiple RIPs, generally referred to collectively as a RIP pipeline, are controlled by a RIP manager. The RIP manager, which can take the form of a hardware or software module, receives the print job, divides it into two or more parts, and then assigns each part to a particular RIP for rasterizing. Each of the RIPs then works independently to rasterize its part of the print job, notifying the RIP manager when done and thus allowing the RIP manager to reassign the RIP to another print job.

One problem that the present inventors recognized with conventional RIPs is that they have limited communications capabilities. In some situations, such as dealing with external clients (that is, other users of the RIP), these limited capabilities effectively reduce the processing speed of the RIPs.

Accordingly, the present inventors identified a need for RIPs with improved communications.

DETAILED DESCRIPTION OF EXEMPLARY EMBODIMENTS

This description, which references and incorporates the above-identified figures and the appended claims, describes one or more specific embodiments of one or more inventions. These embodiments, offered not to limit but only to exemplify and teach the one or more inventions, are shown and described in sufficient detail to enable those skilled in the art to implement or practice the invention. Thus, where appropriate to avoid obscuring the invention, the description may omit certain information known to those of skill in the art.

Figure 1:
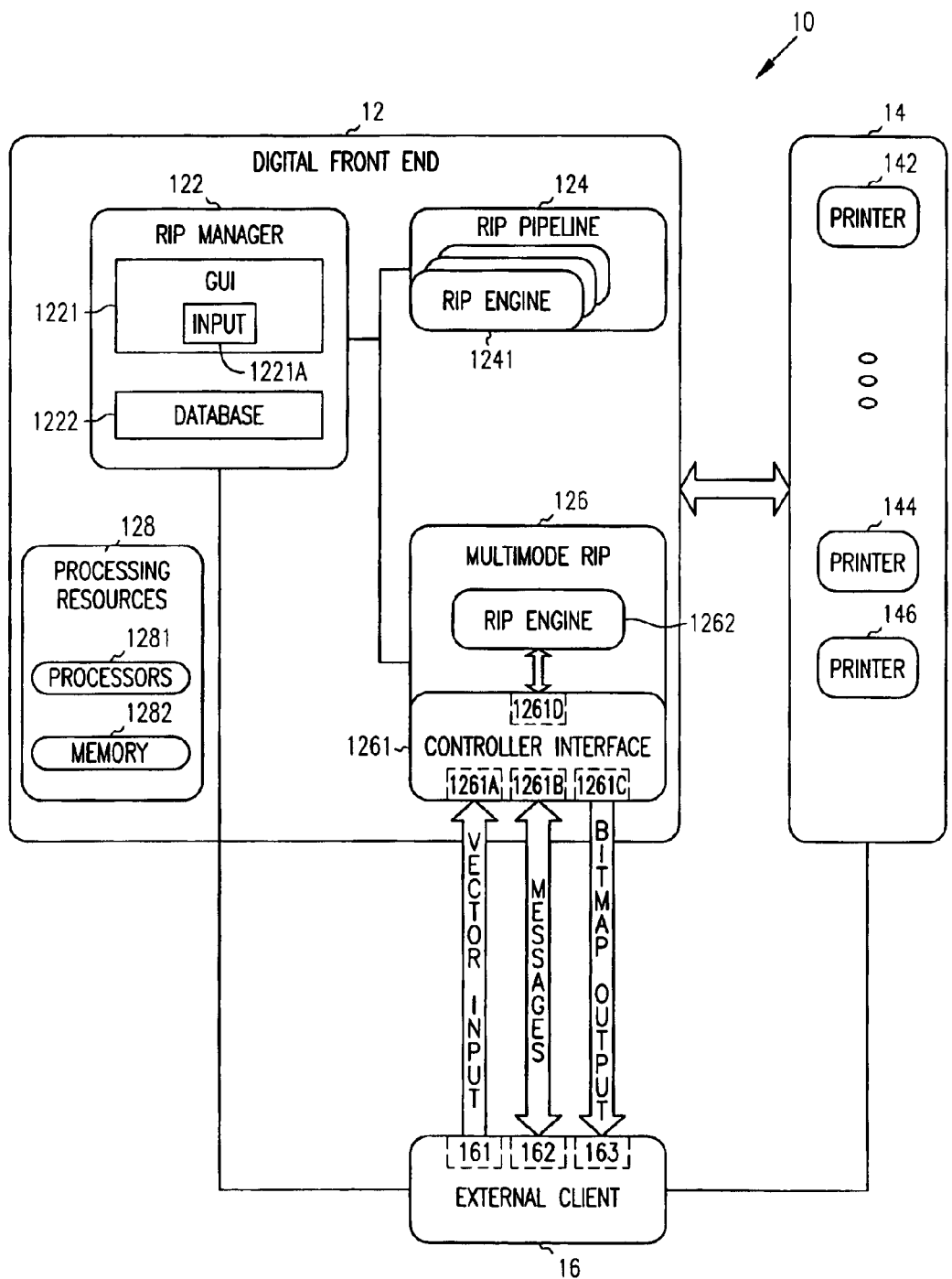
FIG. 1 is a block diagram of an exemplary printing system 100 corresponding to one or more embodiments of the present invention.

FIG. 1 shows an exemplary printing (or hardcopy imaging) system 10 which corresponds to one or more embodiments of the present invention. System 10 includes a digital front end (or print preprocessor) 12, a printer set 14, and an external client 16.

Digital front end 12 includes a RIP manager 122 (more generally a RIP control entity), a RIP pipeline 124, RIP 126, and processing resources 128. Generally, each of these components, with the exception of processing resources 128, comprises one or more modules, objects, or other groupings or encapsulations of underlying functionality implemented in a programming code, such as JAVA or C++, that is carried on an electronic, magnetic, or optical storage medium or carrier signal. These various components can be intercoupled by any form of communications link. For example, the exemplary embodiment assigns each of these components an IP (Internet Protocol) address and communicates via one or more socket-based network protocols. Some embodiments implement one or more of these components in hardware, for example, as one or more application-specific integrated circuits and/or in firmware, for example, as one or more ROM modules.

More specifically, RIP manager 122, which is coupled to RIP pipeline 124 and RIP 126, includes a graphical user interface (GUI) module 1221 and a RIP database 1222. GUI module 1221 includes one or more graphical user interfaces which are displayed on a display device (not shown) and allow users to define or create one or more pipelines and associate one or more RIP engines with each pipeline, using a keyboard, mouse, or other input device (not shown) In particular, GUI module 1221 includes an input (or input region) 1221A, for example in the form of a check box or radio button, which allows users to enable or disable a RIP engine (such as RIP 126) from receiving and/or sending commands and data from entities other than RIP manager 122. Although not shown in the figure, the interface also includes one or more inputs (or input regions) for enabling automatic job acceptance and for setting or selecting automatic job-acceptance criteria, such as job size, job types, and job numbers, for separate RIP engines or RIP pipelines.

RIP database 1222 includes data identifying one or more RIPs (or RIP engines) and related status and address information. In the exemplary embodiment, database 1222 includes for each of one or more RIP engines: a corresponding network address and/or name; a corresponding installation directory path name and/or data; a corresponding current controlling RIP pipeline name or identifier; and corresponding location information for imposition, LUT, and ICC profile directories relative to the corresponding installation path.

RIP pipeline 124 can include two or more RIPs, of which a RIP 1241 is generally representative. (The RIPs in pipeline 124 can be real RIPs, virtual RIPs, or combinations of real and virtual RIPs.) RIP 1241, which is a conventional RIP in the exemplary embodiment, includes conventional RIP software modules and/or hardware (not shown) for rasterizing input vector image data—that is, for converting the vector image data to bit-map (or hardware-ready) data. Examples of input vector image data include PostScript (PS) data, Portable Document Format (PDF) data, and Printer Control Language (PCL) data.

RIP 126, which can be part of RIP pipeline 124 in some embodiments, includes a controller interface 1261 and a RIP engine 1262. Controller interface 1261 enables one of a set of two or more RIP control or management entities, such as RIP manager 122 and external client 16, to control or otherwise communicate with RIP engine 1262. In the exemplary embodiment, controller interface 1261 includes one or more network socket connections (ports, modules, or objects), of which socket ports 1261A, 1261B, 1261C, and 1261D are generally representative.

Socket port 1261A is an input socket port for receiving packetized vector-image data from external client 16. Some embodiments include input socket ports that are devoted to particularly types of vector-image data. For example, one embodiment includes one input socket port for PS data and another for PDF data. Socket port 1261B is a control socket port for communicating packetized messages between the external client and the RIP module, and socket port 1261C is an output socket port for outputting packetized bit-map data from the RIP module to the external client (or other RIP control entity.) In some embodiments, socket port 1261C is part of an output plug-in module that provides the associated RIP module the capability to communicate its output data in packet form via the output port.

Other embodiments may use other forms of interface mechanisms or protocols between controller interface 1261 and external client 16. For example, some embodiments use a Harlequin SOAR (Scalable Open Architecture RIP) application programming interface (API), Adobe CPSI (Configurable PostScript Interpreter) API mechanism, or a hot-folder-based mechanism. The hot-folder-based mechanism may use a set of folders and/or directories (for example, input, error, success, and output folders) as intermediate storage for messages, with multi-controller interface and RIPs monitoring the folders for new messages. Some embodiments base the controller interface on a Common Object Request Broker Architecture (CORBA). Examples of this form of architecture include System Object Model (SOM), Distributed SOM (DSOM), Component Object Model (COM), and Distributed COM (DCOM). Some embodiments use a Remote Procedure Call (RPC) architecture or protocol.

Socket port 1261D functions as an intermediary between socket ports 1261A–1261C and RIP engine 1262. In other words, socket port 1261D translates and/or reformats commands and data to and/or from the commands and data native to RIP engine 1262.

RIP engine 1262 provides conventional rasterizing of one or more types of vector-image data, such as PS data or PDF data. In some embodiments, RIP engine 1262 includes a two or more specialized RIP engines and thus constitutes a RIP pipeline.

Processing resource 128 comprises one or more processing entities 1281 and memory (or data storage) devices 1282 for implementing the functionality of RIP manager 122, RIP pipeline 124, and RIP 126. In the exemplary embodiment, processing entities 1281 include one or more integrated central processing units, and storage devices 1282 include one or more volatile or non-volatile memory devices. Although shown as a centralized arrangement in this exemplary embodiment, some embodiments distribute one or more of these resources across a network.

In addition to digital front end 12, system 10 includes printer set 14 and external client 16. Printer set 14 includes a set of one or more printing or hard-copy imaging devices, of which printers 142, 144, and 146 are generally representative. Exemplary printers include: HP Indigo 1000, HP Indigo 3000, HP Indigo w3200, HP LaserJet, HP DeskJet, and HP DesignJet printers, which are available from Hewlett-Packard Company of Palo Alto, Calif. (HP, Indigo, Laserjet, DeskJet, and DesignJet are trademarks of Hewlett-Packard Company.)

External client 16 (more generally a RIP control entity) includes a computing device or other entity, such as an application or object, capable of controlling or otherwise communicating with a RIP, such as RIP 126. In the exemplary embodiment, client 16 takes the form of a variable-data-printing (VDP) manager within or without the same machine or processor(s) that implement digital front end 12. More particularly, external client 16 includes software modules or objects 161, 162, and 163 for communicating respectively with socket ports 1261A, 1261B, and 1261C of controller interface 1261.

Figure 2:
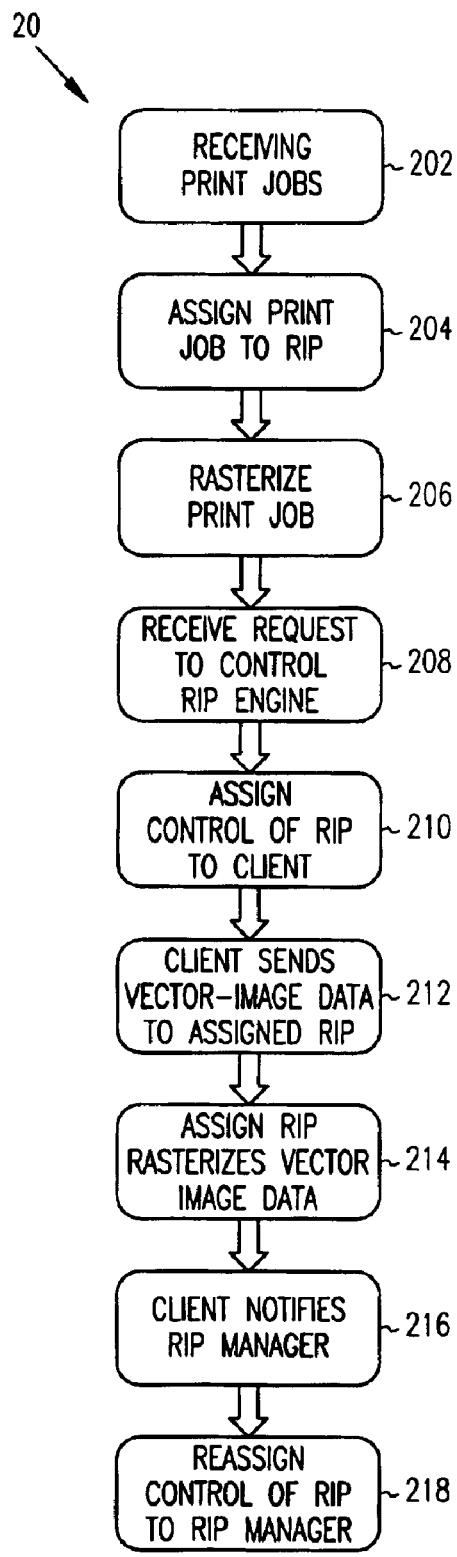
FIG. 2 is flow chart of an exemplary method of operating one or more portions of printing system 100.

FIG. 2 shows a flowchart 20 of an exemplary method of operating system 100. Flow chart 20 includes process blocks 202–218, which may generally correspond to machine-readable and executable instructions or sets of instructions stored or carried on a storage medium or carrier signal for implementing various operations and/or components of system 100. Though these blocks are arranged and/or described sequentially, other embodiments may reorder the blocks, omit one or more blocks, combine two or more blocks, and/or execute two or more blocks in parallel using multiple processors or a single processor organized as two or more virtual machines or subprocessors. Moreover, still other embodiments implement the blocks as one or more specific interconnected hardware or integrated-circuit modules with related control and data signals communicated between and through the modules. Thus, this and other exemplary process flows in this document are applicable to software, firmware, hardware, and other types of implementations.

The exemplary method begins at block 202 which entails digital front end 12 (in FIG. 1), or more precisely RIP manager 122, receiving at least one print job for processing. In the exemplary embodiment, the print job is received from a device, such as desktop publishing station (not shown), via a socket connection or link to a local-area or wide-area network. The print job, which may take the form of a Job Definition Format (JDF) job ticket, includes vector image data, such as PostScript (PS) data, Portable Document Format (PDF) data, or Printer Control Language (PCL) data, and a rasterization specification. Execution continues at block 204.

In block 204, RIP manager 122 assigns the job (or a portion thereof) to a RIP, such as RIP 126. The assignment, along with the relevant portion of the vector image data from the print job, passes through controller interface 1261 to RIP engine 1262. In the exemplary embodiment, the RIP manager communicates with RIP 126 (as well as other RIPs) over message channels that reference URLs (Uniform Resource Locators) of files that are transferred asynchronously between the RIP manager and the RIP engine. Execution proceeds to block 206.

Block 206 entails RIP 126 rasterizing the data and transferring the rasterized data to printer set 14 for printing. In the exemplary embodiment, this rasterization occurs in compliance with the rasterization specification using any technology suitable for the given vector image data and the targeted printer. Once rasterization is complete, RIP 126 notifies RIP manager 122 that it has completed its rasterization assignment. In the exemplary embodiment, this notification entails the RIP engine sending a "job done" message to the RIP manager. In response, the RIP manager updates RIP database 1222 to reflect the available status of RIP 126. Execution continues to block 208.

In block 208, RIP manager 122 receives a request from external client 16 to control one of the RIP engines. In the exemplary embodiment, this entails RIP manager 122 receiving a request from external client 16 to use a RIP. However in other embodiments, the request may identify a specific RIP or a set of RIP criteria that RIP manager 122 uses to identify an appropriate RIP, by for example searching RIP database 1222 for available RIPs that are associated with RIP manager 122 and that meet or comply with the RIP criteria. In some embodiments, the client may request a RIP engine specifically for VDP jobs. Execution then continues at block 210.

Block 210 entails RIP manager 112 assigning or transferring control of an appropriate RIP, such as RIP 126, over to the external client. In the exemplary embodiment, this entails the RIP manager sending an "enter direct mode" message via controller interface 1261 (more precisely socket port 1261B) to RIP engine 126, with the message identifying a set of one or more socket ports and a network name of the external client. "Direct mode" refers to a communication mode that allows direct communication between a RIP engine and an external client (or other RIP-control entity) without using the RIP manager as an intermediary or pass-through.

In exemplary response to the "enter direct mode" message, RIP 126 initializes itself for interaction with the client and communicates a "direct mode ready" message to RIP manager 122. Initialization entails launching one or more threads to monitor socket ports 1261A and 126B for incoming data. In turn, RIP manager 112 sends a message identifying the RIP by its IP address to external client 16.

Block 212 entails the external client sending vector image and related control or message data directly to the identified RIP engine, in this case RIP 126. The precise form of this communication and the controller interface for the identified RIP engine is generally contingent on the implementation of external client and the RIP engine. In the exemplary embodiment, the data is sent to one or more input socket ports associated with the controller interface, such as input port 1261A, and ultimately conveyed via socket port 1261D to RIP engine 1262. Other embodiments may omit an intermediate socket port, such as port 1261D.

In block 214, the RIP module rasterizes the received image vector data. In the exemplary embodiment, the RIP engine buffers and rasterizes the data as it is received and outputs the corresponding bit-map data, through the controller interface, more precisely output socket port 1261C, to the external client. When the client has finished sending data to the RIP engine, the client closes the input socket port 1261A, signaling controller interface 1261 for RIP 126 to close intermediate socket port 1261D between the controller interface and the RIP module. The RIP module interprets this closure as an "end of job" signal, and closes the output socket port after all output data has been forwarded to the client (or other location), advancing execution to block 216.

In block 216, the external client notifies the RIP manager that it has finished using the identified or assigned RIP. Execution of the exemplary method then advances to block 218.

Block 218 entails the RIP manager (or other RIP control entity) making the RIP engine available for use by itself and/or other RIP control entities, such as other external clients or other RIP managers. In the exemplary embodiment, this entails the RIP manager sending an "exit direct mode" message to the RIP engine, moving the virtual representation of the RIP engine to a temporary holding place until the RIP engine reports back to the RIP manager that it is ready for static processing, and updating the status of the RIP engine in the RIP engine database to indicate its availability. In response to the "exit direct mode" message, the RIP engine is restored to a state enabling it to handle requests from the RIP manager. In some instances, the RIP engine may be reassigned to a RIP pipeline to process static jobs.

CONCLUSION

The embodiments described in this document are intended only to illustrate and teach one or more ways of practicing or implementing the present invention, not to restrict its breadth or scope. The actual scope of the invention, which embraces all ways of practicing or implementing the teachings of the invention, is defined only by the following claims and their equivalents.

What is claimed is:

1. A method comprising:
   controlling a RIP engine using a first RIP control entity;
   controlling the RIP engine using a second RIP control entity; and
   wherein controlling the RIP engine using the first RIP control entity, comprises the first RIP control entity sending first vector image data to the RIP engine and receiving corresponding first bit-map data from the RIP engine.

2. The method of claim 1, wherein controlling the RIP engine using the second RIP control entity, comprises the second RIP control entity sending second vector image data to the RIP engine and receiving corresponding second bit-map data from the RIP engine.

3. A method comprising:
   controlling a RIP engine using a first RIP control entity;
   controlling the RIP engine using a second RIP control entity; and
   wherein the first RIP control entity includes e RIP manager and the second RIP control entity includes a variable-data-printing manager.

4. A method comprising:
   controlling a RIP engine using a first RIP control entity;
   controlling a RIP engine using a second RIP control entity;
   transferring control of the RIP engine from the first RIP control entity to the second entity, wherein transferring control comprises:
   the second RIP control entity sending a request to the first RIP control entity and
   the first RIP control entity enabling the RIP engine to communicate with the second RIP control entity in response to the request.

5. The method of claim 4, wherein enabling the RIP engine to communicate with the second RIP control entity in response to the request, comprises:
   the first RIP control entity commanding the RIP engine to enter a specific mode of operation; and
   the first RIP control entity communicating an IP address associated with the RIP engine to the second RIP control entity.

6. A machine-readable medium comprising instructions for:
   controlling a RIP engine using a first RIP control entity;
   controlling the RIP engine using a second RIP control entity;
   wherein the instructions for controlling the RIP engine using the first RIP control entity, comprise instructions for the first RIP control entity sending first vector image date to the RIP engine and facilitating receipt of corresponding first bit-map data from the RIP engine; and
   wherein the instructions for controlling the RIP engine using the second RIP control entity, comprise instructions for the second RIP control entity sending second vector image data to the RIP engine and facilitating receipt of corresponding second bit-map data from the RIP engine.

7. A machine-readable medium comprising instruction transferring control of a RIP engine from a first RIP control entity to a second RIP control entity, wherein the instructions for transferring control of the RIP engine from the first RIP control entity to the second RIP control entity, comprise instructions for:

facilitating receipt of a request from the second RIP control entity; and commanding or enabling the RIP engine to communicate with the second RIP control entity in response to the request.

8. The medium of claim 7, wherein the instructions for commanding or enabling the RIP engine to communicate with the second RIP control entity in response to the request, comprise instructions for:

causing the first RIP control entity to command or enable the RIP engine to enter a specific mode of operation; and causing the first RIP control entity to communicate en IP address associated with the RIP engine to the second RIP control entity.

9. A system comprising:

a first RIP control entity for controlling at least one RIP engine;

a second RIP control entity for controlling at least one RIP engine;

a controller interface for communicating with at least one of the first and second RIP control entities:

a RIP engine operatively coupled to the controller interface; and wherein the first RIP control entity includes a RIP manager and the second RIP control entity includes a variable-data-printing manager.

10. The system of claim 9, further comprising a printer coupled to at least one of the first and second RIP control entities.

11. The system of claim 9, wherein the controller interface comprises a socket port for communicating with at least one of the first and second RIP control entities.

12. A system comprising:

a first RIP control entity for controlling at least one RIP enable;

a second RIP control entity for controlling at least one RIP engine;

a controller interface for communicating with at least one of the first and second RIP control entities;

a RIP engine operatively coupled to the controller interface; and wherein each RIP control entity comprises:

means for sending first vector image data to the RIP engine; and means for receiving corresponding first bit-map data from the RIP engine.

13. Apparatus comprising:

a RIP controller interface for enabling control of a RIP engine by one of at least first and second RIP control entities wherein the RIP controller interlace comprises:

at least one socket port for receiving vector image data; and at least one socket port for outputting bit-map data.

14. The apparatus of claim 13, wherein the RIP controller interface further comprises:

at least one socket port for sending and receiving massages between the one of the RIP control entities and the RIP engine.

15. The apparatus of claim 14, wherein the messages exclude vector image data and bit-map data.

16. The apparatus of claim 13, wherein the RIP controller interface further comprises another socket port of receiving vector image data.

17. The apparatus of claim 13, wherein each socket port includes a Transmission Control Protocol port.

18. The apparatus of claim 13, further comprising a RIP manager for communicating with the RIP controller interface; and a RIP engine for communicating with the RIP manager via the RIP controller interface.

19. Apparatus comprising:

a RIP controller interface for enabling control of a RIP engine by one of at least first and second RIP control entities; a variable-data-printing manager for communicating with the RIP controller interface; and a RIP engine for communicating with the variable-data-printing manager via the RIP controller interface.

20. Apparatus comprising:

first means for controlling a RIP engine; and means for enabling control of a RIP engine by one of at least the first means for controlling the RIP engine and a second means for controlling the RIP engine; and wherein the first means for controlling the RIP engine comprises a means for sending first vector image data to the RIP engine and receiving corresponding first bit-map data from the RIP engine.

21. The apparatus of claim 20, wherein the first means for controlling the RIP engine comprises a variable-data-printing manager.

* * * * *

UNITED STATES PATENT AND TRADEMARK OFFICE
CERTIFICATE OF CORRECTION

| | | |
|---|---|---|
| PATENT NO. | : 6,929,411 B2 | Page 1 of 1 |
| APPLICATION NO. | : 10/654415 | |
| DATED | : August 16, 2005 | |
| INVENTOR(S) | : Robert D. Christiansen et al. | |

It is certified that error appears in the above-identified patent and that said Letters Patent is hereby corrected as shown below:

IN THE CLAIMS

Claim 3, Column 6, line 25, delete "e" and insert therefor --a--

Claim 8, Column 7, line 18, delete "en" and insert therefor --an--

Claim 12, Column 7, line 44, delete "enable" and insert therefor --engine--

Claim 13, Column 8, line 9, delete "interlace" and insert therefor --interface--

Claim 14, Column 8, line 16, delete "massages" and insert therefor --messages--

Signed and Sealed this

Twenty-seventh Day of May, 2008

JON W. DUDAS
*Director of the United States Patent and Trademark Office*